INVENTOR.
JACOB MARLOW
BY William E. Cleaver
ATTORNEY.

Sept. 2, 1969  J. MARLOW  3,465,238
POSITION AND VELOCITY DETECTING APPARATUS
Filed Oct. 2, 1967  3 Sheets-Sheet 2
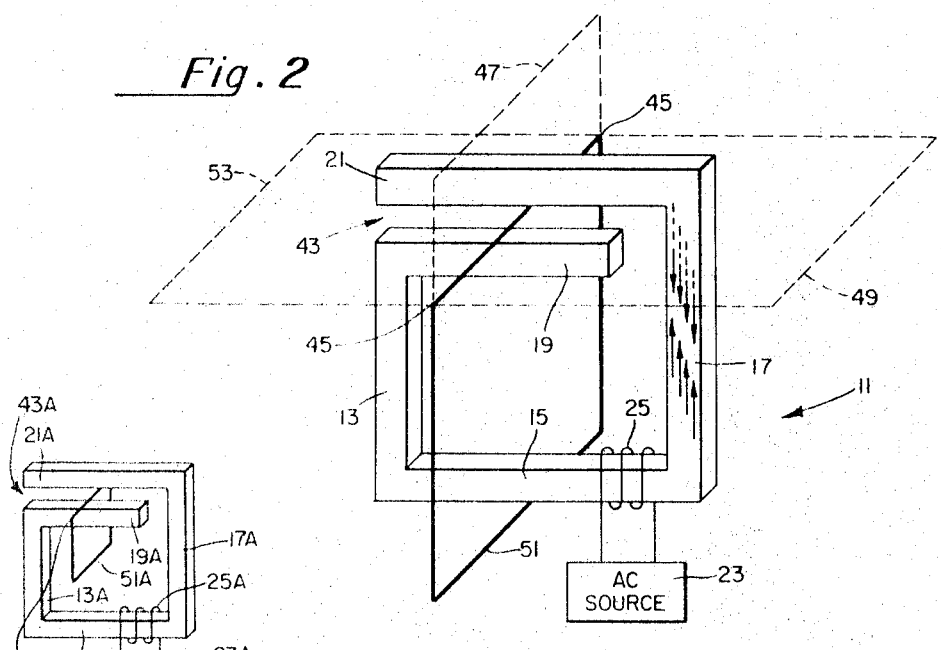
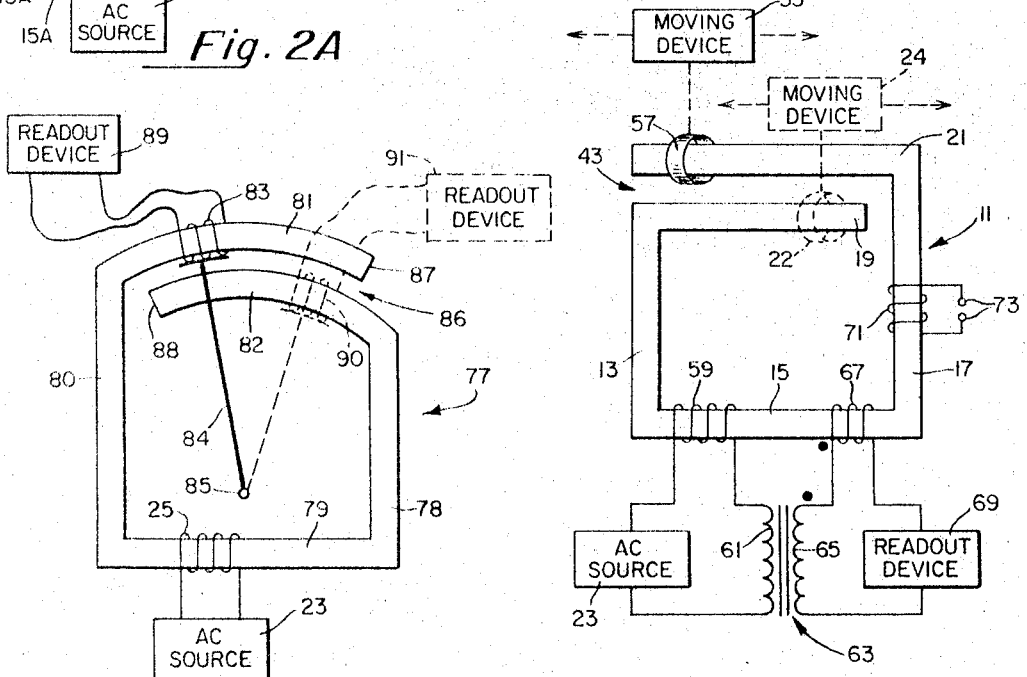
INVENTOR.
JACOB MARLOW
BY William E. Cleaver
ATTORNEY.

INVENTOR.
JACOB MARLOW
BY William E. Cleaver
ATTORNEY.

3,465,238
POSITION AND VELOCITY DETECTING APPARATUS
Jacob Marlow, 327 Valley View Road,
King of Prussia, Pa. 19406
Filed Oct. 2, 1967, Ser. No. 672,365
Int. Cl. H02p *13/08, 13/10*
U.S. Cl. 323—53    23 Claims

ABSTRACT OF THE DISCLOSURE

The present apparatus provides a ferromagnetic flux path means which has at least two legs which overlap. A gap is formed between said at least two legs which define said overlap portion of the flux path means. At least one moveable electrical conductor coil is embracing at least one of the said two last-mentioned legs. The flux path means is subjected to an A.C. magnetomotive force which produces an alternating flux therein and the formation of the flux path at the overlap legs thereof enables a controlled distribution pattern of flux to be provided within and along said gap. Within the leg members which make up the overlap there is a controlled flux gradient developed which changes from a condition of low intensity at the cross-sectional area of such leg members where the flux, considered as a whole, has the longest excursion to high intensity at the cross-sectional area of such leg members where the flux, considered as a whole, has the shortest excursion. Accordingly, as the position of the conductor coil is changed along the leg which is embracing, the alternating flux linking the conductor coil either increases or decreases as a function of the conductor coil position. It follows that since $E = \omega \phi N$, the output voltage provided by the conductor coil is indicative of the position of the conductor coil. In another embodiment two such flux path means are connected by an additional leg to form a third magnetic circuit. An electrical conductor coil links this additional leg and, conveniently, a permanent bar magnet is arranged to rotate within the properly formed outside legs of the two flux path means. The bar magnet is mounted within the pair of conductor coils which conductor coils can be positioned along, and are embracing each of two legs forming the gaps. The conductors can be interconnected to provide voltage as a function of the position as explained above. As the bar magnet changes its velocity while rotating through an angle, the denominator "$dt$" of the equation $E = d\phi/dt$ will also change.

It follows also that the voltage induced in the conductor coil linked by the "$d\phi$" in this additional leg will be a function of the velocity at which the position change takes place.

---

This invention relates to position and velocity detecting apparatus and more particularly to apparatus which produces electrical signals whose amplitudes are indicative of positions and velocities assumed by a moveable device associated therewith.

Background

In the prior art of position-detecting apparatus employing a magnetic principle to produce an electrical signal in response to the position of an associated member, the device usually comprises a three-legged core path formed of ferromagnetic material with a central leg. The central leg, in particular, is formed to provide an air gap with the outer member of the path. Within this air gap there is normally provided same sort of flux barrier device, moveably mounted with respect to said outer member. In addition, in such devices, alternating current flux is provided by a primary winding which is mounted on the central leg. The flux barrier device controls the distribution of the flux between the two outer legs in response to its position. On each of the outer legs there is mounted an associated coil. These two outer leg coils are usually differentially series-connected which provides a difference output signal depending upon the amount of flux which is linking the respective outer leg coils. When the flux barrier device is located in the center of the middle leg there is a null, or a zero voltage condition, provided at the output terminals of the two series-connected outer coils. As the flux barrier is moved away from this null position, the flux linking one of the outer coils becomes greater than the flux linking the other outer coil and hence there is generated a net voltage across the output terminals of the series-connected outer coils.

This structure has been satisfactory for a number applications but is limited in that the length or the angle of movement under any central leg is normally relatively small. Hence, the distance or the angle through which a device connected to the flux barrier can be moved and detected is quite limited. In addition, it has been determined that the flux through the center leg to the lower cross-member of the path fringes at the ends and is therefore non-linear. Hence, output signals at the ends of the gap become non-linear, further reducing useful angle or distance. Furthermore, such devices do not have the means to generate voltage as a function of velocity at which a position change or an angle change of the moveable device takes place.

Summary

The present apparatus provides a means which offers a large distance or angle over which a controlled magnetic flux is produced. In addition, this magnetic flux which appears in the gap creates a controlled gradient of the flux in the overlapping legs which form that gap. If the gap sides are parallel, this gradient changes linearly from very small to very great intensity. The present invention provides a ferromagnetic flux path means of appropriate thickness which has two legs or sections thereof that overlap but never come in contact. These extensions or legs form a long gap therebetween. At the respective open ends of the extensions or at the position of the longest flux excursion, the flux intensity therein is relatively small, while at the respective ends of the extensions which are integral with the remainder of the path or the position of the shortest flux excursion, the flux intensity is relatively large. At every position along the overlap, the flux in one leg plus the flux in the other leg equals the total flux in the path.

The overlap extensions can take many configurations and can be in many multiples thereof so that all sorts of combinations of signals can be provided and added together, or subtracted one from the other to provide the proper kind of output signals in accordance with a position, or a position and velocity, or only velocity of the moving member to be measured.

The present invention is analyzed in detail and the objects and the advantages thereof will be better understood from the following description considered in conjunction with the accompanying drawings, in which:

FIGURE 2 is a schematic-pictorial of the basic embodiment.

FIGURE 2A is a schematic-pictorial of a second embodiment of the device shown in FIGURE 2.

FIGURE 3 shows that basic embodiment, with a shorted conductor and a transformer.

FIGURE 4 shows the basic embodiment with arcuately formed overlap sections.

Figure 1:
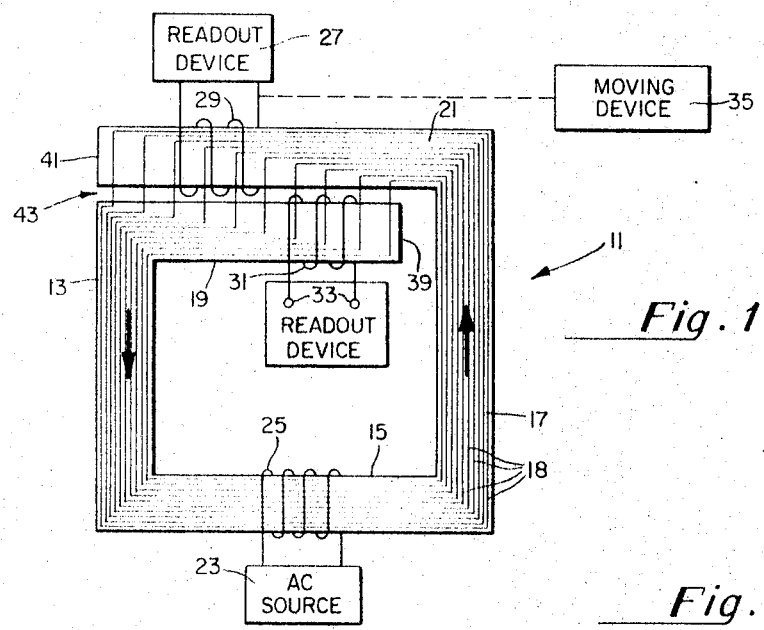
FIGURE 1 is a schematic view of a basic embodiment of the present invention.

Consider first FIGURE 1 which shows the basic structure of the present invention in accordance with which the basic principles of the operation can be understood. In FIGURE 1 there is shown a ferromagnetic core 11 of appropriate thickness, which is made up of a left outer piece 13, a lower section 15, a right outer section 17, a lower overlap section 19 and upper overlap section 21. Also depicted in FIGURE 1 is an A.C. voltage source 23 which is connected to an excitation winding 25. In addition, in FIGURE 1 there is shown a readout device 27 which is connected to a movable output winding 29. Finally, in FIGURE 1 there is shown a second moveable winding 31 having output terminals 33.

As can be readily noted in FIGURE 1, the first moveable output winding 29 is embracing the upper overlap section 21, while the second moveable output winding 31 is embracing the lower overlap leg 19. For purposes of illustration, the upper moveable winding 29 is shown mechanically connected to a moving device 35. The moving device 35, as a practical matter, might be anything of the nature of a float in a liquid level measuring device or a connection to a servo system shaft and the like. When the moving device 35 changes position, it changes the position of the upper moveable winding 29 by virtue of its mechanical linkage thereto.

Now assume that the A.C. voltage source 23 provides an A.C. voltage to the excitation winding 25 which in turn generates a magnetomotive force and hence a magnetic flux 18 in the ferromagnetic core 11. For purposes of illustration, the flux has been depicted as having a squared off excursion around the path, i.e., sharp cornered turns. The pattern shown is not to be construed to be the actual pattern of the flux, but only as a means of illustrating that the flux at the end 39 of the lower overlap leg 19 is substantially less intense than the flux found at the integral end of the leg 19, i.e., where it joins the leg 13. The same is true of the open end 41 of the leg 21 when compared with the integral end of the 21. It should be further understood that while this flux is shown having an excursion around the ferromagnetic core in a counterclockwise direction, the flux is actually reversing and going in a clockwise direction on every half cycle in accordance with the A.C. magnetomotive force applied to the core by means of the excitation coil in conjunction with the energy from the source 23. The flux distribution pattern is only shown in FIGURE 1, but it is to be understood that a similar flux distribution pattern is considered present in every other figure when an excitation voltage is supplied.

Now as it is depicted in the structure of FIGURE 1, there is a gap 43 formed between the upper overlap leg 21 and the lower overlap leg 19. Further as is depicted in FIGURE 1, there is flux continually crossing this last-mentioned gap and there is the same amount of flux crossing this gap near the end 39 of the lower overlap leg 19 as there is crossing the gap at the end 41 of the upper overlap leg 21. I have found that the flux which traverses the gap is uniform and homogeneous within and along the gap if the gap has parallel sides. However, if the gap is tapered the flux is non-uniform and non-homogeneous. A gap with parallel sides gives rise to a linear flux distribution pattern in the overlap legs as can be seen from the distribution pattern of FIGURE 1. In other words, the flux in the upper leg 21 is less intense at the open end 41, than at the integral end where it joins leg 17.

Now assume that the upper movable winding 29 is located at the position shown and hence the A.C. flux is linking said winding and thereby inducing a voltage in it which can be detected at the readout device 27 in accordance with the equation $E = \omega \phi N$, where $\omega$ is the circular velocity (frequency of the excitation source), $\phi$ is the flux at a given point and N is the number of conductors linking the $\phi$. This output voltage would be relatively small in amplitude since the $\phi$ factor of the foregoing equation would be relatively small, i.e., the moveable winding 29 is located at the low intensity end of the flux path. Further assume for the purpose of understanding the operation of the device that the moving device 35 is moved to the right of the figure and hence by mechanical linkage displaces the moveable winding 29 to the right, thereby having the moveable winding 29 linked by an A.C. flux of greater intensity than that by which it was linked in the position shown in the figure. As the moveable winding 29 assumes each new position to the right from where it is shown, the $\phi$ factor in the above equation increases and hence a greater voltage amplitude signal will be induced and read at the readout device 27. It follows that the readout device can be calibrated in terms of inches or pounds or any other physical units which may cause the moving device to be moved or may be applied to the summing junction of a closed loop servo system. It also follows that this moveable winding is generating a voltage which may be used in some analog operation that provides this detection of the position of the moving device without any wearable moving parts in contrast to the moveable contacts of the slide wires, potentiometers and rheostats.

It should be further understood that the magnitude of flux passing through the leg 19 cross-sectional area plus the magnitude of flux passing through the leg 21 cross-sectional area will be equal to the magnitude of flux passing through the cross-sectional areas of any one of the legs 13, 15 or 17, provided that the cross-sectional area is taken within a plane drawn anywhere through the gap and perpendicular to the sides of the gap as well as perpendicular to the surface of the ferromagnetic path. Accordingly, it is possible to locate the lower moveable winding 31 at any given position and sum its output with the output from the upper winding 29. Both windings can also be connected differentially to obtain zero voltage output at a position anywhere along the gap, which position will be determined by the ratio of the number of turns of the winding 29 and the winding 31. In addition to the arrangement shown in FIGURE 1, it should be understood that the coil 31 can also be connected to a moveable device and that the position of that device can also be detected at the same time that the position of the moving device 35 is detected.

Figures 1A, 1B:
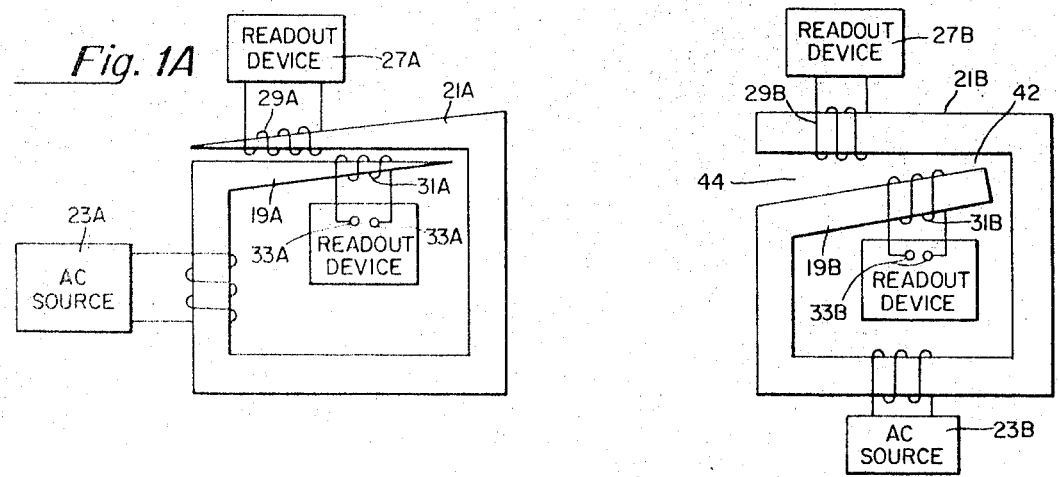
FIGURE 1A is a schematic view of a second embodiment of the device shown in FIG. 1.
FIGURE 1B is a schematic view of a third embodiment of the device shown in FIGURE 1.

FIGURE 1A shows a variation of the device of FIGURE 1. In FIGURE 1A the overlap legs 21A and 19A are tapered. However, it will be noted that the gap between the overlap legs is formed to have its side walls parallel. The gap represents a reluctance and since the reluctance is uniform along the gap, the flux distribution along and within the gap is uniform and homogeneous. The flux density in the tapered legs will be greater than in the legs of FIGURE 1 but will be constant within the legs per se. Accordingly, the flux will increase in the tapered leg 21A when the cross-sectional area thereof is considered from left to right in the same way that the flux increased in the leg 21 of FIGURE 1. In this case the voltage induced in either winding 29A or 31A will be proportional to the leg's cross-sectional area, to wit: $E = \omega BAN$, where $\omega$ is circular velocity (frequency) of the excitation source 23A, B is the flux density at any point in 19A or 21A, A is the cross-sectional area at a given point in 19A or 21A, and N is the number of turns of either 29A or 31A, that is, the number of conductors in the gap.

On the other hand, FIGURE 1B shows the configuration of FIGURE 1 with the gap tapered. In this case the portion of the gap at position 42 offers less reluctance than the portion of the gap at position 44. Accordingly, the flux in the gap of the device shown in FIGURE 1B will be non-linear. In the device of FIGURE 1B there will be a greater amount of flux crossing the gap at position 42 than there is crossing the gap at position 44. Consequently, the voltage induced in either of the windings 29B or 31B will be non-linear function of the position.

Figures 1C, 1D:
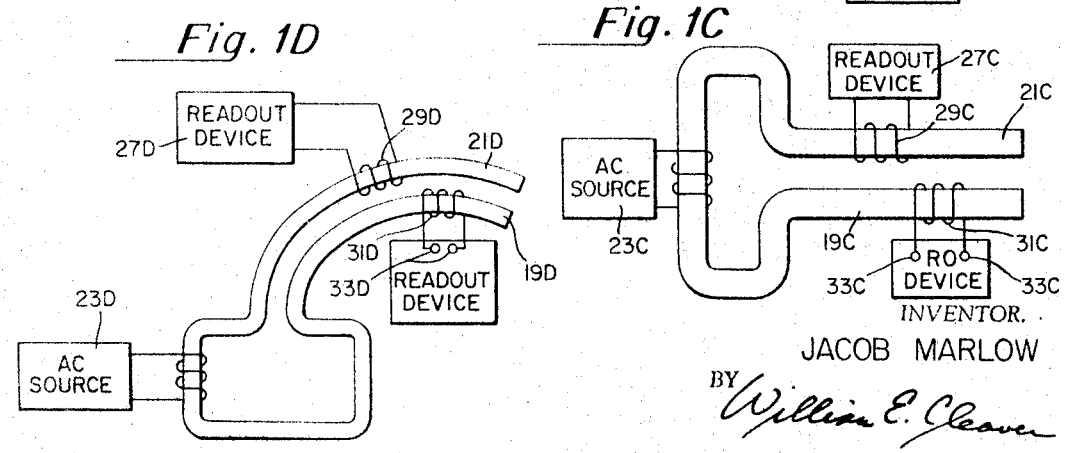
FIGURE 1C is a schematic view of a fourth embodiment of the device shown in FIGURE 1.
FIGURE 1D is a schematic view of a fifth embodiment of the device shown in FIGURE 1.

FIGURE 1C shows the basic structure of FIGURE 1 but with the overlap sections re-arranged so that the open ends thereof are opposite to each other. The operation of this device is similar to the operation of the device shown in FIGURE 1 and therefore a detailed explanation thereof is not needed. The elements of the structure are identified with numerals corresponding to counterparts in the device of FIGURE 1.

FIGURE 1D illustrates the basic structure of FIGURE 1 in a form similar to the embodiment shown in FIGURE 1C. However, the structure in FIGURE 1D has the overlap sections arcuately formed which renders the gap arcuately formed. The operation of the structure of FIGURE 1D should also be apparent from the previous discussion.

FIGURE 2 is shown for the purpose of illustrating that only one portion of a moveable winding need be in the gap to provide an output signal which is indicative of the position of that winding whereas the remainder of the winding can be located anywhere outside the ferromagnetic core structure. For instance, consider the pictorial view of conductor 45, which can have a return conductor whose end section 47, 49, 51, 52 we can see at any one of the positions illustrated. In other words, the various return conductors are shown by the dashed lines connecting the ends of the conductor 45 with 47, or 45 with 49, or 45 with 51, or 45 with 53. Even though one of these return conductors assumes a new position, it is only the presence of the conductor 45 (or in the case of a multiple wound conductors the number of conductor strands 45) linked by the flux at the given point in the leg 21 that enables the device to measure the position of the conductor or conductor strands 45. If the conductor is formed as shown in FIGURE 2A, then it is only the presence of the conductor 45A linked by the flux at the given point in the lower leg 19A that enables the device to measure the position of the conductor 45A. The relative position of the return conductor end sections 47, 49, 51 and 53 is immaterial to the induction of an output voltage indicative of the position of the conductor 45.

FIGURE 3 depicts the ferromagnetic core 11 having a proper stack or thickness with a short-circuited conductor 57 shown as the moveable element mechanically connected to the moving device 35. As the short-circuited conductor 57 is embracing the upper overlap leg 21, a counter E.M.F. is induced which causes opposing short-circuit current and hence an opposing flux generated in the ferromagnetic core so as to diminish the flux generated by the excitation winding 59 which will manifest itself by the near absence of flux in the portion of the leg 21 left of the conductor 57. Assume that the A.C. voltage source 23 provides an A.C. voltage to the excitation winding 59 and simultaneously to the primary winding 61 of the transformer 63. The A.C. voltage applied to the primary winding 61 will induce a voltage in the secondary winding 65. However, the flux generated by the excitation winding 59 induces a voltage in the winding 67. In accordance with the manner in which the winding 67 is connected to the secondary winding of the transformer 65, the voltages developed by these last two mentioned windings will be in differential relationship to one another.

Assume that there is a magnetomotive force applied to the core by the winding 59 and further assume that the voltage induced in the winding 67 is greater than the voltage induced in the winding 65 and hence there is a difference of potential across the readout device at the phase direction determined by the winding 67. Further assume that the short-circuited conductor 57 is moved to the right by the moving device 35 such that a greater amount of opposing flux is generated in the core 11. Under this set of circumstances, the flux linking the winding 59 will be diminished and accordingly the impedance of this winding will be diminished, changing the ratio of the voltage division across the winding 59 and the winding 61. It should be remembered that the sum of voltage drops across the winding 59 and the winding 61 must be equal to the applied excitation voltage from the source 23. With the change in the flux magnitude in the core 11 and the change of the voltage magnitude across the winding 61, the difference between the voltage across the winding 67 and across the winding 65 changes and is apparent that the voltage across the readout device 69 will also change. By arranging the detecting device to be a differential amplifier or some other electrical means which measures the difference of potential across the series connection of the windings 67 and 65, the position of the flux interceptor 57 can be determined. The winding 71 and voltage developed at its output terminals 73 can also be used to determine the position of the flux interceptor 57. A short-circuited conductor 22 embracing lower overlap leg 19 and mechanically linked to the moving device 24 can also be used as an alternative embodiment with analogous results. The second shorted turn 22 and moveable device 24 are shown to indicate that the structure shown in FIGURE 3 can also accommodate two shorted turns and two movable devices.

FIGURE 4 shows an embodiment of the present invention which enables the same to be used to measure an angular position of a rotatable shaft. In FIGURE 4 the ferromagnetic core 77 having a certain stack or thickness is made up of the legs 78, 79, and 80 as well as two overlapped legs 81 and 82 which form a concentric gap 86 and have open ends 87 and 88. The moveable coil 83 is mounted by means of a connecting member 84 to a shaft 85. As the shaft 85 rotates, the moveable winding 83 is moved along the overlap leg 81 and, assuming that the A.C. voltage source 23 has provided an A.C. voltage to the excitation winding 25, there will be a flux gradient in the legs 81 and 82 as described earlier.

As the moveable winding 83 is embracing the upper overlap leg 81 and is linked by the alternating flux generated by the excitation winding 25, it provides an output voltage at the readout device 89. The voltage appearing at the readout device 89 has an amplitude which is a function of and is indicative of the angular position of the moveable winding 83 and hence the shaft 85. While only short arcuately shaped overlap portions are shown, it becomes perfectly clear that the overlap portions could be long arcuately formed legs to enable a large angle of the shaft rotation to be measured. Another moveable winding 90 can be arranged to embrace lower overlap 82, to be mechanically connected to the shaft 85 and to be electrically connected to the readout device 91. The winding 90 can then be used as an alternative arrangement to the winding 83, or it can be used in conjunction with the winding 83 to produce higher gain voltage output function of the angular position of the shaft 85 by connecting windings 83 and 90 series-adding.

Figure 5:
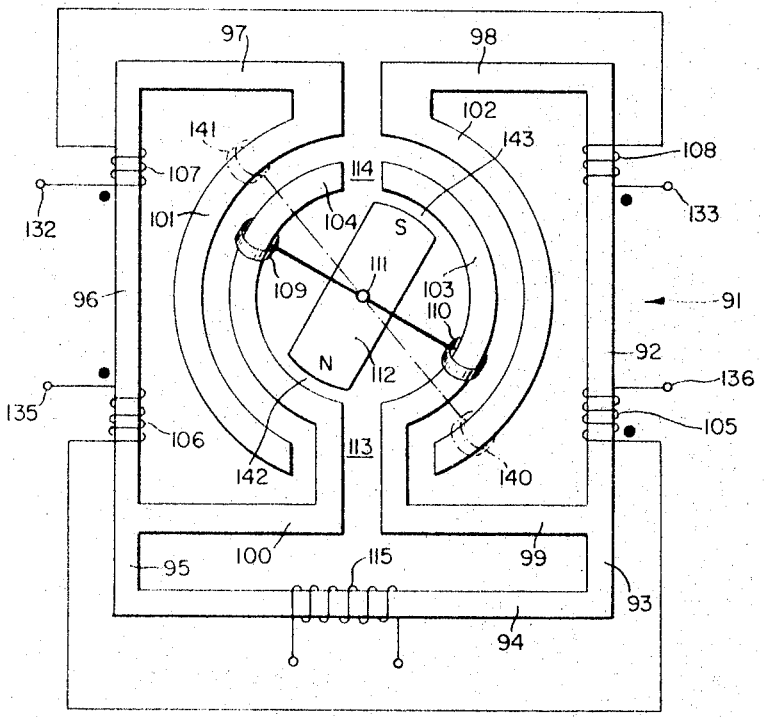
FIGURE 5 shows a double basic structure and a permanent magnet addition.

In FIGURE 5 there is shown an embodiment of the present invention which enables the device to measure both the angular velocity of a shaft movement as well as its angular position. In FIGURE 5 there is shown a ferromagnetic core 91 having proper practical thickness, which is made up of the legs 92, 93, 94, 95, 96, 97, 98, 99, 100 and two sets of concentric overlapping leg pairs comprised of the leg pairs 101, 104, and 102, 103.

On the leg 92 there is an excitation winding 105 while on the leg 96 there is an excitation winding 106. These excitation windings are series-connected and are wound to generate a flux in first ferromagnetic circuit comprised by legs 92, 99, 103, 102, 98 and in second ferromagnetic circuit comprised by legs 96, 100, 104, 101 and 97. Also on the leg 96 there is an output winding 107 while on the leg 92 there is an output winding 108. Actually the output windings 107 and 108 could be used as excitation windings while the excitation windings 105 and 106 could be considered as output windings. Although it is not shown, it should be understood that there is a source of A.C. excitation voltage connected to the terminals 135 and 136 of the windings 105 and 106, similar to the A.C. excitation voltage source of the previous figures. In addition it should be understood that there is a readout device connected to the terminals 132 and 133.

Let us consider first what happens in the configuration of FIGURE 5 without the presence of the flux interceptors 109 and 110 and when there is an A.C. excitation voltage applied to the windings 105 and 106. When the windings 105 and 106 are energized there is flux passing during a particular half cycle of the excitation voltage northward along the leg 92, westward along the leg 98, southward along the inner overlap leg 102, crossing the concentric gap at all points therealong to the outer overlap leg 103, southward along the outer overlap leg 103, and returning along the leg 99 to the other side of the leg 92. In a similar manner flux would pass during the same particular half cycle from the winding 106, northward along the leg 96, eastward along the leg 97, southward along the inner overlap leg 101 crossing the concentric gap at all points therealong to the outer overlap leg 104, southward along the outer overlap leg 104, and along the leg 100 back to the lower portion of the leg 96 to the other side of winding 106. It should be understood that the distribution of the flux along the inner and outer overlap legs would be similar to that described with respect to FIGURES 1 through 4.

Now if the flux interceptors 109 and 110, which are in the form of shorted conductor rings, were present and were in the position as shown in FIGURE 5 and the flux pattern were similar to that just described earlier, it would follow that there would be a greater magnitude of flux linking the shorted conductor 110 than there would be linking the shorted conductor 109.

The foregoing is true because the distribution of the flux across the gap would be uniform and hence there would be more flux present in the leg 103 at the illustrated position of the flux interceptor 110 than there would be present in the leg 104 at the position of the flux interceptor 109, since both flux interceptors are arranged diammetrically opposite and mechanically fixed to the shaft 111. In accordance with the flux distribution just described there would be a greater back E.M.F. induced in the shorted conductor 110 than in the shorted conductor 109. As a consequence, there will be a greater back magnetomotive force generated by the shorted conductor 110 than by the shorted conductor 109. Hence, the net flux linking the winding 108 would be less than the net flux linking the winding 107. It follows therefore, that the output voltage from the winding 107 would dominate the output voltage from the winding 108. If the terminals 132 and 133 of these windings were connected in the differential mode and connected to the sensing device, such as a difference amplifier, the relative positions of the flux interceptors 109 and 110 and hence the shaft 111 could be determined.

Now let us assume further that anchored to the shaft 111 there is a permanent bar magnet 112. In the position of the shaft illustrated, the flux from the magnet 112 passes through the third ferromagnetic circuit from the north pole through the gap 142, through the leg 100, southward through the leg 95, eastward through the leg 94, northward through the leg 93, through the leg 99, through the outer extension 103, and through the gap 143 to the south pole of the permanent magnet 112.

It should be recognized that when the permanent magnet 112 is located in the center position, the north pole lies opposite the channel 113 while the south pole lies opposite the channel 114. Accordingly, the flux path would simply be from the north pole equally divided through the leg 103 and the leg 104 back to the south pole lying opposite the channel 114. However, as the permanent magnet is rotated to the position shown in the figure, the flux takes the path previously described and links the winding 115. The equation $d\phi dt = E$ holds then for the voltage induced in the winding 115. Since $d\phi$ varies during the magnet clockwise or counter-clockwise rotation from the central position to some other position along the legs 103 and 104, we find that the corresponding voltage of a particular, or opposite to it, polarity will be induced in the winding 115. As the denominator $dt$ becomes smaller, the induced voltage will assume greater amplitude. Hence, the velocity of the rotation of the shaft 111 can be detected by means of the winding 115 and the angular position of the shaft can be detected by employing the shorted conductor rings or flux interceptors 109 and 110. While it is recognized that there is a slight back E.M.F. induced in the shorted conductor rings by the variation of the flux from the rotating permanent magnet, this back E.M.F. is negligible. The separate fluxes generated in all three ferromagnetic circuits by the excitation voltage as well as the permanent magnet operate in a net sense independently of each other. In other words, there is an angular velocity detection made as well as an angular position detection made by means of a single planar ferromagnetic structure without an interference of the fluxes generated for the respective purpose of detecting these independent variables. In FIGURE 5 there is shown in phantom a shorted conductor ring 140 and a shorted conductor ring 141. The shorted rings 140 and 141 are shown connected in phantom of the rotatable shaft 111. The flux interceptors 140 and 141 thus indicated embrace now the overlap sections 101 and 102. This structure would operate under such arrangement in a manner similar to that already described with respect to shorted conductor rings 109 and 110.

Figure 6:
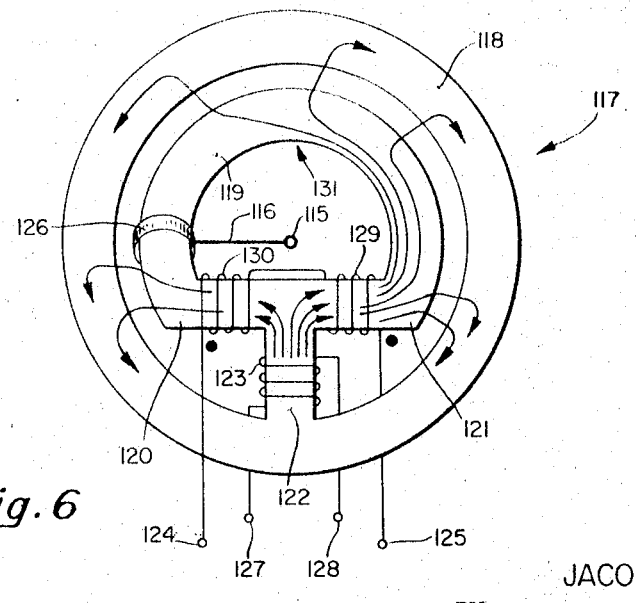
FIGURE 6 shows an embodiment with continuous overlap sections.

Consider now FIGURE 6 which shows another embodiment of the present invention which has the added advantage that there is no open end overlap arrangement with hereto attendant flux fringing of the open ends and therefore less flux fringing can be expected. As was indicated earlier, if the side walls of the gap are held in a parallel position or in the case of angular position detecting devices in the concentric position, there is a linear flux distribution developed in the overlap legs. In FIGURE 6 there is shown a ferromagnetic core 117 having a convenient stack thickness and made up of a circular member 118 and an arcuate member 119 concentric to the member 118, two base legs 120 and 121 as well as a center leg 122. In the operation of the device shown in FIGURE 6 (assuming no shorted conductor ring) the excitation winding 123 is wound on the center leg 122 and, when energized, provides a flux therefrom through the leg 121, through the right-hand side of the arcuate member 119, crossing the concentric gap at all points therealong into the right-hand half of the circular member 118, and back to the other side of the leg 122. In addition, there is another half of the flux generated by the winding 123 passing through the leg 120, along the left-hand side of the arcuate member 119 from the reference midpoint 131, crossing the gap at all points therealong into the left-hand portion of the circular member 118, and back to the other side of the leg 122. If there is no shorted conductor ring present on the arcuate member 119, the flux would be evenly divided in both halves of the circular member 118 and of the arcuate member 119 and hence there would be no difference of potential developed at the terminals 124 and 125, since both windings 129 and 130 have conveniently the same number of turns and hence have voltage induced in them equal in magnitudes but, because of a particular connection shown, opposite in phase. However, with the shorted conductor ring 126 present and mechanically connected by means of a linkage 116 to a rotatable shaft 115 and embracing the arcuate member 119, the flux is intercepted and hence provides a difference of potential between the terminals 124 and 125. The foregoing is effected in the following manner.

Let us suppose that the excitation winding 123 has been energized by virtue of an A.C. voltage being applied to the terminals 127 and 128. The flux will follow the pattern just described and briefly depicted in the figure so as to provide a relatively high flux linking the shorted conductor ring 126 at the position shown. Accordingly, there will be a relatively large back E.M.F. developed in the flux interceptor 126 causing short-circuit current in it and, consequently, a relatively large back magnetomotive force generated by the conductor 126, and hence the flux passing along the right-hand path of the winding 123 will no longer simply terminate its excursion at the midpoint 131 of the arcuate member 119, but indeed will pass around the midpoint and continue to where the shorted conductor ring exists while crossing the gap all along the excursion. The flux pattern will result in a substantial amount of flux passing into the ring member 118 on the left-hand side of the midpoint 131 as well as the previously described flux passing along the right-hand portion of the ring member 118. Accordingly, a greater amount of flux will link the winding 129 as compared to the winding 130. In this way there wil be a larger voltage induced in the winding 129 than in the winding 130 and this will be reflected in the potential developed at the terminals 124 and 125. Hence, the angular position of the shorted ring 126 can be determined since the output voltage is a linear function of the angular position.

As the flux interceptor 126 is moved toward the midpoint 131, it will intercept less flux and hence the voltage generated in the winding 130 will more nearly approach the voltage generated in the winding 129. When the flux interceptor 126 is exactly at the midpoint 131, the voltages in the two windings 130 and 129 will be equal and hence the voltages appearing at the terminals 124 and 125 will be zero. As the flux interceptor 126 moves along the arcuate member 119 to the right-hand side of the midpoint 131, there will be a greater voltage developed in the winding 130 than in the winding 129 in accordance with the same flux interception principle just described. In the above discussion, a presumption is made that the number of turns of the winding 129 is equal to the number of turns of the winding 130. Under other conditions, a zero voltage output at the terminals 124 and 125 can be experienced at a flux interception position other than the midpoint 131.

Hence, the embodiment of the invention shown in FIGURE 6 provides a means for measuring the angular position of a shaft 115 over a large arcuate excursion and has the advange of being a continuous piece which tends to keep the gap uniform thereby providing a linear flux distribution pattern through the overlapping members 118 and 119.

The embodiments of the invention in which an exclusive property is claimed are defined as follows:

1. A voltage generating device to generate a voltage indicative of the position of a movable means comprising:
   (a) means for applying a magnetomotive force;
   (b) magnetic flux path means, including at least first and second sections, coupled to said means for applying a magnetomotive force, and further including a gap, said magnetic flux path means formed to have said first section overlap said second section along its length to provide said gap therebetween and to provide a predetermined magnetic flux gradient in each of said first and second sections and a predetermined magnetic flux distribution through said gap; and
   (c) first electrical conducting means formed and disposed to be linked by magnetic flux passing through said first section and movably mounted with respect thereto in order to generate a voltage in said first electrical conducting means indicative of the position thereof.

2. A voltage generating device according to claim 1 wherein there is further included second electrical conducting means formed and disposed to be linked by magnetic flux passing through said second section and movably mounted with respect thereto in order to generate a voltage in said second electrical conducting means indicative of the position thereof.

3. A voltage generating device according to claim 1 wherein the sidewalls of said gap are parallel and accordingly wherein the magnetic flux distribution throughout said gap is uniform.

4. A voltage generating device according to claim 1 wherein the sidewalls of said gap are not parallel and accordingly wherein the magnetic flux distribution throughout said gap is non-uniform.

5. A voltage generating device according to claim 1 wherein the sidewalls of said gap are concentric and accordingly wherein the magnetic flux distribution throughout said gap is uniform.

6. A voltage generating device according to claim 1 wherein the sidewalls of said gap are non-concentric and accordingly wherein the magnetic flux distribution throughout said gap is non-uniform.

7. A voltage generating device according to claim 1 wherein said first electrical conducting means is a short-circuited conductor formed and disposed to be linked by magnetic flux passing through said first section and adapted to be connected to said movable means and wherein there is further included a detecting electrical conductor formed and disposed to be linked by magnetic flux passing through said magnetic flux path means to detect the magnetic flux not intercepted by said short-circuited conductor.

8. A voltage generating device according to claim 7 wherein there is further included a second short-circuited conductor formed and disposed to be linked by magnetic flux passing through said second section and adapted to be conected to a second movable means.

9. A voltage generating device according to claim 7 wherein there is further included said short-circuited conductor formed and disposed to be linked by magnetic flux passing through said second section and adapted to be connected to a second movable means.

10. A voltage generating device according to claim 1 wherein said first electrical conducting means is a short-circuited conductor formed and disposed to be linked by magnetic flux passing through said first section and adapted to be connected to said movable means and wherein said means for applying a magnetomotive force includes a first electrical conductor winding which is formed and disposed to be linked by magnetic flux passing through said magnetic flux path means and a transformer whose primary winding is serially connected to said first electrical conductor winding and whose secondary winding is serially connected to a second electrical conductor winding formed and disposed to be linked by magnetic flux passing through said magnetic flux path means.

11. A voltage generating device according to claim 1 wherein said first electrical conducting means is a short-circuited conductor formed and disposed to be linked by magnetic flux passing through said second section and adapted to be connected to said movable means and wherein said means for applying a magnetomotive force includes a first electrical conductor winding which is formed and disposed to be linked by magnetic flux passing through said magnetic flux path means and a transformer whose primary winding is serially connected to said first electrical conductor winding and whose secondary winding is serially connected to a second electrical conductor winding formed and disposed to be linked by magnetic flux passing through said magnetic flux path means.

12. A voltage generating means device according to claim 1 wherein said first and second sections are arcuately formed thereby causing said gap to be arcuately formed.

13. A voltage generating device according to claim 12 wherein said first electrical conducting means is connected to a rotatable shaft to enable said first electrical conductive means to rotate through an arc.

14. A voltage generating means device according to claim 1 wherein there is included a second magnetic flux path means, including at least third and fourth sections, coupled to said means for applying a magnetomotive force, said second magnetic flux path means formed to have said third section overlap said fourth section along its length to provide a gap therebetween and to provide a predetermined magnetic flux gradient in each of said third and fourth sections and a predetermined magnetic flux distribution throughout said gap and wherein said first electrical conducting means is a first short-circuited conductor and further including a second electrical conductor means comprising a second short-circuited conductor formed and disposed to be linked by magnetic flux passing through said third section and wherein there is further included first and second detecting electrical conductive windings formed and disposed to respectively be linked by magnetic flux passing through said first and said second magnetic flux path means to detect the combined positions of said first and second short-circuited conductors.

15. A voltage generating device according to claim 14 wherein said first and second sections are arcuately formed and said third and fourth sections are arcuately formed and wherein there is included a rotatable shaft to which said first short-circuited conductor and said second short-circuited conductor are secured to enable said rings to rotate through an arc.

16. A voltage generating device according to claim 15 wherein there is further included a source of magnetomotive force secured to said rotatable shaft in order to rotate said source and a third magnetic flux path means magnetically connected to said first and second magnetic flux path means and wherein there is further included a third electrical conducting means formed and disposed to be linked by magnetic flux passing through said third magnetic flux path means in order to generate a voltage indicative of the angular velocity of said rotatable shaft.

17. A voltage generating device according to claim 1 wherein said second section is substantially ring-shaped and wherein said first section is substantially ring-shaped and formed to fit within said substantially ring-shaped second section thereby causing said gap to be substantially ring-shaped, said second section magnetically connected to said first section by a magnetic flux path bridge means and wherein said first electrical conducting means is a first short-circuited conductor and wherein there is further provided first and second detecting electrical conducting windings formed and disposed to be linked by magnetic flux passing through said first section.

18. A voltage generating means device according to claim 1 wherein said first section has an open end and is integral with said magnetic flux path means at its other end and wherein said second section has an open end and is integral with said magnetic flux path means at its other end and wherein said first section is disposed to have its open end lie opposite the integral end of said section, and said second section is disposed to have its open end lie opposite the integral end of said first section.

19. A voltage generating device according to claim 1 wherein said first and second sections are formed to provide a high magnetic flux density at the respective cross-sectional areas thereof whereat the magnetic flux has its shortest excursion and a low magnetic flux density at the respective cross-sectional areas thereof whereat the magnetic flux has its greatest excursion.

20. A voltage generating device according to claim 1 wherein said first section has an open end and is integral with said magnetic flux path means at its other end and wherein said second section has an open end and is integral with said magnetic flux path means at its other end and wherein said first section is disposed to have its open end lie opposite the open end of said second section and wherein said first section is disposed to have its integral end lie opposite the integral end of said second section.

21. A voltage generating device according to claim 20 wherein said first and second sections are arcuately formed thereby causing said gap to be arcuately formed.

22. A voltage generating device according to claim 1 wherein said first electrical conducting means has a first section thereof disposed within said gap and a second section thereof disposed outside said magnetic flux path means.

23. A voltage generating device according to claim 1 wherein said first electrical conducting means has a first section thereof disposed within said gap and a second section thereof disposed within the area whose boundaries are defined by said magnetic flux path means.

References Cited
UNITED STATES PATENTS

| | | | |
|---|---|---|---|
| 2,375,591 | 5/1945 | Schweitzer | 336—234 X |
| 3,197,702 | 7/1965 | Schweitzer | 324—127 |
| 3,353,131 | 11/1967 | Stubbs et al. | 336—130 |

JOHN F. COUCH, Primary Examiner

G. GOLDBERG, Assistant Examiner

U.S. Cl. X.R.
324—70; 336—130